(12) United States Patent
Juvonen

(10) Patent No.: US 10,034,332 B2
(45) Date of Patent: Jul. 24, 2018

(54) ARRANGEMENT FOR SEALING A BELLOWS CYLINDER IN A PRESSURE BLOCK OF A PRESSURE RING ASSEMBLY

(71) Applicant: OUTOTEC (FINLAND) OY, Espoo (FI)

(72) Inventor: Seppo Juvonen, Porvoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 202 days.

(21) Appl. No.: 14/913,556

(22) PCT Filed: Aug. 22, 2014

(86) PCT No.: PCT/FI2014/050645
§ 371 (c)(1),
(2) Date: Feb. 22, 2016

(87) PCT Pub. No.: WO2015/028709
PCT Pub. Date: Mar. 5, 2015

(65) Prior Publication Data
US 2016/0212803 A1    Jul. 21, 2016

(30) Foreign Application Priority Data
Aug. 27, 2013  (FI) .................................. 20135864

(51) Int. Cl.
*H05B 7/10* (2006.01)
*H05B 7/12* (2006.01)
(Continued)

(52) U.S. Cl.
CPC ............... *H05B 7/10* (2013.01); *F27D 11/10* (2013.01); *F27D 99/0073* (2013.01); *H05B 7/12* (2013.01); *F16J 15/56* (2013.01); *F27B 3/10* (2013.01)

(58) Field of Classification Search
CPC ......... F27D 99/0073; H05B 7/10; H05B 7/12; F27B 3/10; F16J 15/16; F16J 15/56
See application file for complete search history.

(56) References Cited

U.S. PATENT DOCUMENTS 3,983,310 A * 9/1976 Fischer .................. H01B 7/425
174/15.7
4,577,325 A * 3/1986 Mertin ................... H05B 7/105
373/101
(Continued)

FOREIGN PATENT DOCUMENTS

CN        2822094 Y    9/2006
CN        1926923 A    3/2007
(Continued)

OTHER PUBLICATIONS

International Search Report (PCT/ISA/210) dated Nov. 4, 2014, by the Finnish Patent Office as the International Searching Authority for International Application No. PCT/FI2014/050645.
(Continued)

*Primary Examiner* — Nicholas L Foster
(74) *Attorney, Agent, or Firm* — Buchanan Ingersoll & Rooney PC

(57) ABSTRACT

Provided is an arrangement for sealing a bellows cylinder in a pressure block of a pressure ring assembly. The bellows cylinder is located in a cavity formed in the pressure block and is operated by hydraulic fluid to give pressure against a contact shoe of a contact shoe ring arranged on the inside of the pressure ring assembly. The bellows cylinder is sealed to the cavity. A sealing bowl is arranged on the bellows on the inner side of the pressure block. The sealing bowl has an essentially flat surface towards the contact shoe and is provided with a side edge extending into the cavity. A circumferential groove containing a gasket ring is on the side wall of the cavity. A flexible sealing ring is arranged
(Continued)

around the gasket ring to give tension and pressure on the gasket ring against the side edge of the sealing bowl.

6 Claims, 5 Drawing Sheets

(51) Int. Cl.
*F27D 11/10* (2006.01)
*F27D 99/00* (2010.01)
*F27B 3/10* (2006.01)
*F16J 15/56* (2006.01)

(56) References Cited

U.S. PATENT DOCUMENTS

| | | | | |
|---|---|---|---|---|
| 5,711,206 A | * | 1/1998 | Goettel | F04B 39/042 277/468 |
| 6,957,605 B1 | * | 10/2005 | Blume | F04B 53/143 277/436 |
| 2011/0156324 A1 | | 6/2011 | Vegge et al. | |

FOREIGN PATENT DOCUMENTS

| | | |
|---|---|---|
| CN | 202005006 U | 10/2011 |
| CN | 202095124 U | 12/2011 |
| CN | 202177312 U | 3/2012 |
| CN | 202928374 U | 5/2013 |
| CN | 203052053 U | 7/2013 |
| EP | 1876866 A2 | 1/2008 |
| EP | 1 971 190 A2 | 9/2008 |
| FR | 2 835 688 | 8/2003 |
| WO | WO 2010/033108 A1 | 3/2010 |

OTHER PUBLICATIONS

Written Opinion (PCT/ISA/237) dated Nov. 4, 2014, by the Finnish Patent Office as the International Searching Authority for International Application No. PCT/FI2014/050645.

International Preliminary Report on Patentability (Chapter II of the Patent Cooperation Treaty) (PCT Article 36 and Rule 70) (PCT/IPEA/409) dated Aug. 11, 2015, in the corresponding International Application No. PCT/FI2014/050645. (15 pages).

* cited by examiner

ARRANGEMENT FOR SEALING A BELLOWS CYLINDER IN A PRESSURE BLOCK OF A PRESSURE RING ASSEMBLY

FIELD OF THE INVENTION

The present invention relates to an arrangement for sealing a bellows cylinder in a pressure block of a pressure ring assembly. More specifically, the invention relates to an arrangement for sealing a bellows cylinder in a pressure block of a pressure ring assembly of an electrode system of an electric arc furnace, in the inner surface of which pressure block a cavity is formed and the bellows of the bellows cylinder is located in said cavity, said bellows cylinder being operated by hydraulic fluid to give pressure against a contact shoe of a contact shoe ring arranged on the inside of the pressure ring assembly, the bellows cylinder being sealed to the cavity with a sealing arrangement.

BACKGROUND OF THE INVENTION

An electric arc furnace is an electrically operated furnace used for melting metal and/or for cleaning slag. The operation of the furnace is based on an arc flame that burns either between separate electrodes, or between electrodes and the material to be melted. The furnace may be operated either by AC or DC current. Heat is created in the arc flame, and also in the material to be melted, in case the arc flame burns between the material and the electrodes. Power is conducted to vertical electrodes that are located symmetrically in a triangle with respect to the midpoint of the furnace. In the case of a DC smelting furnace there is one electrode in the middle of the furnace. The assembly depth of the electrodes in the furnace is continuously adjusted, because they are worn at the tips owing to the arc flame.

The lower part of the electrode column assembly comprises a contact shoe ring, a pressure ring and a heat shield. The contact shoe ring consists of a plurality of contact shoe elements arranged as a ring to be in contact with a steel mantle inside of which the electrode paste is sintered. Such an electrode is a so-called Söderberg electrode. The contact shoe elements conduct electric current to the electrode. A pressure ring is arranged on the outside of the contact shoe ring, so that the contact shoe ring is surrounded by said pressure ring. The pressure ring consists of a plurality of pressure blocks connected with each other as a ring, which pressure blocks being provided with hydraulic bellows by which the contact shoes in the contact shoe ring are pressed against the steel mantle of the electrode. A heat shield surrounding the electrode column assembly is arranged above the pressure ring in the axial direction of the electrode column assembly. Also the heat shield is comprised of a plurality of segments connected with each other to form an assembly of annular form.

As mentioned above, the pressure ring consists of a plurality of pressure blocks connected with each other as a ring. The pressure blocks are commonly made of massive copper elements and they are provided with bellows with which a pressing force towards the contact shoes is created to press said contact shoes against the electrode. The bellows are maintenance free without any moving parts. However, if dust can penetrate between the bellows it may get bogged down. Also hot furnace gases can cause damage to the bellows cylinder or hydraulic fluid contained therein. With further reference to prior art document EP1971190 shows a pressure ring assembly in which the pressure blocks or pressure ring segments are provided with piston arrangements and sealings comprising a complex structure with multiple elements.

OBJECTIVE OF THE INVENTION

An objective of the present invention is to provide a novel arrangement for sealing a bellows cylinder in a pressure block of a pressure ring assembly in an electrode system of an electric arc furnace, which arrangement overcomes the disadvantages and drawbacks relating to prior art.

SUMMARY OF THE INVENTION

The objectives of the present invention are attained by the arrangement being essentially characterized in that on the inner side of the pressure block a sealing bowl is arranged on the bellows, the sealing bowl having an essentially flat surface towards the contact shoe and being provided with a side edge extending into the cavity, that a circumferential groove is made on the side wall of the cavity and a gasket ring is arranged into said groove, and that a sealing ring made of flexible material is arranged around the gasket ring to give tension and pressure on the gasket ring against the side edge of the sealing bowl.

The gasket ring has preferably an L-shaped form comprising a radial branch extending into the circumferential groove and an axial branch resting on the side edge of the sealing bowl. The flexible sealing ring is arranged in the groove around the axial branch of the gasket ring and axially outwards from the radial branch of the gasket ring.

The gasket ring is made of antimagnetic material, preferably bronze.

The material of the flexible sealing ring is preferably silicon.

An electric insulating sheet is preferably arranged between the sealing bowl and the outer surface of the contact shoe.

Among the advantages attained by the invention can be mentioned that the tightness of the pressure ring assembly is much better than in prior art arrangements. The tightness is very important because the content of carbon dioxide in the furnace must be sufficient. Also the very fine dust coming from the furnace can stick the bellow. That can cause insufficient pressure between the contact shoes and the electrode casing and can cause unwanted arcing. So indeed, the tightness is of high importance.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
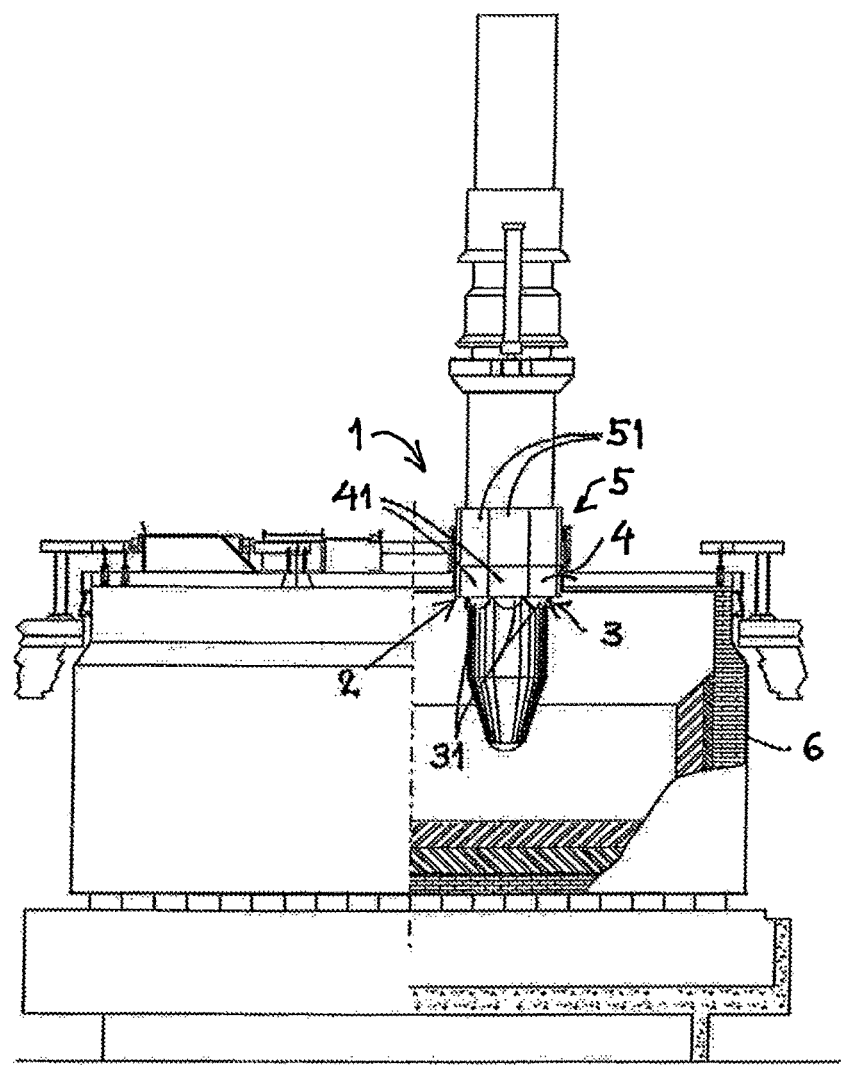
FIG. 1 is a schematic elevation side view of an electric arc furnace.

FIG. 1 shows a schematic illustration of an electric arc furnace 6. The furnace 6 comprises a plurality of electrode column assemblies 1, but for the sake of simplicity only one of them is shown in FIG. 1.

Figure 2:
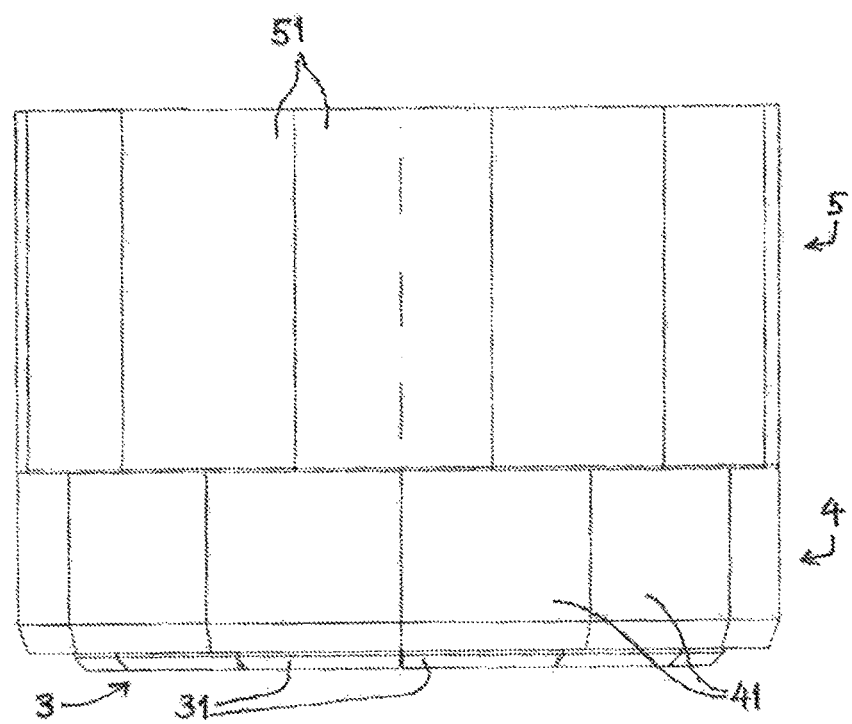
FIG. 2 is schematic elevation side view of a lower electrode column assembly of the electric arc furnace of FIG. 1 in a larger scale.
Figure 3:
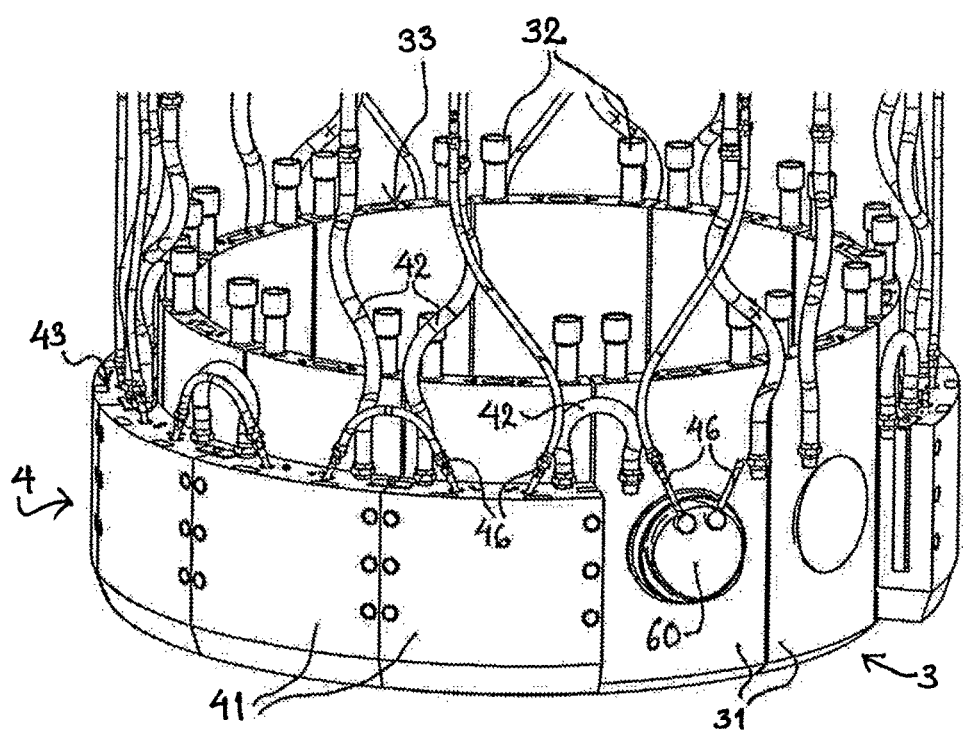
FIG. 3 is an axonometric view of a part or the lower electrode column assembly.

With reference to FIGS. 1, 2 and 3 an electrode lower column assembly 2 is located in the lower part of the electrode system. The electrode lower column assembly 2 comprises a contact shoe ring 3, a pressure ring 4 and a heat shield 5. The contact shoe ring 3 is configured to be placed in contact with the electrode to conduct electric current to the electrode. The contact shoe ring 3 comprises a plurality of contact shoe elements 31. The contact shoe elements 31 are arranged in an annular form to surround the electrode. The contact shoes 31 are pressed against the steel mantle of the electrode with the aid of a plurality of hydraulic bellows arranged in the pressure ring 4 that surrounds the contact shoe ring 3. The pressure ring 4 comprises a plurality of pressure blocks 41 connected to each other to form an annular ring. Preferably each of the pressure blocks 41 is provided with a hydraulic bellows cylinder 60 as mentioned above. The structure of the bellows cylinder 60 is described in more detail in connection with FIGS. 4 and 5. A heat shield 5 is located above the pressure ring 4 in the axial direction of the electrode column assembly 1. The heat shield 5 comprises a plurality of heat shield segments 51 connected to each other to form an annular ring surrounding the lower electrode column assembly 2.

As it can be seen in FIG. 3 pipes 32, 42 are connected to the contact shoe elements 31 of the contact shoe ring 3 and to the pressure blocks 41 of the pressure ring 4. Said pipe connections are arranged at upper ends 33, 43 of the contact shoe elements 31 and pressure blocks 41. The pipes 32, 42 are arranged for a cooling liquid to be led into and out of the contact shoe elements 31 and pressure blocks 41 to maintain their temperature at a desired level. Further, pipes 46 are shown in FIG. 3. Said pipes 46 are connected to the bellows cylinder 60 which in FIG. 3 is shown as separated from the pressure block 41. The pipes 46 are arranged for hydraulic fluid to be supplied to the bellows cylinder 60.

Figure 4:
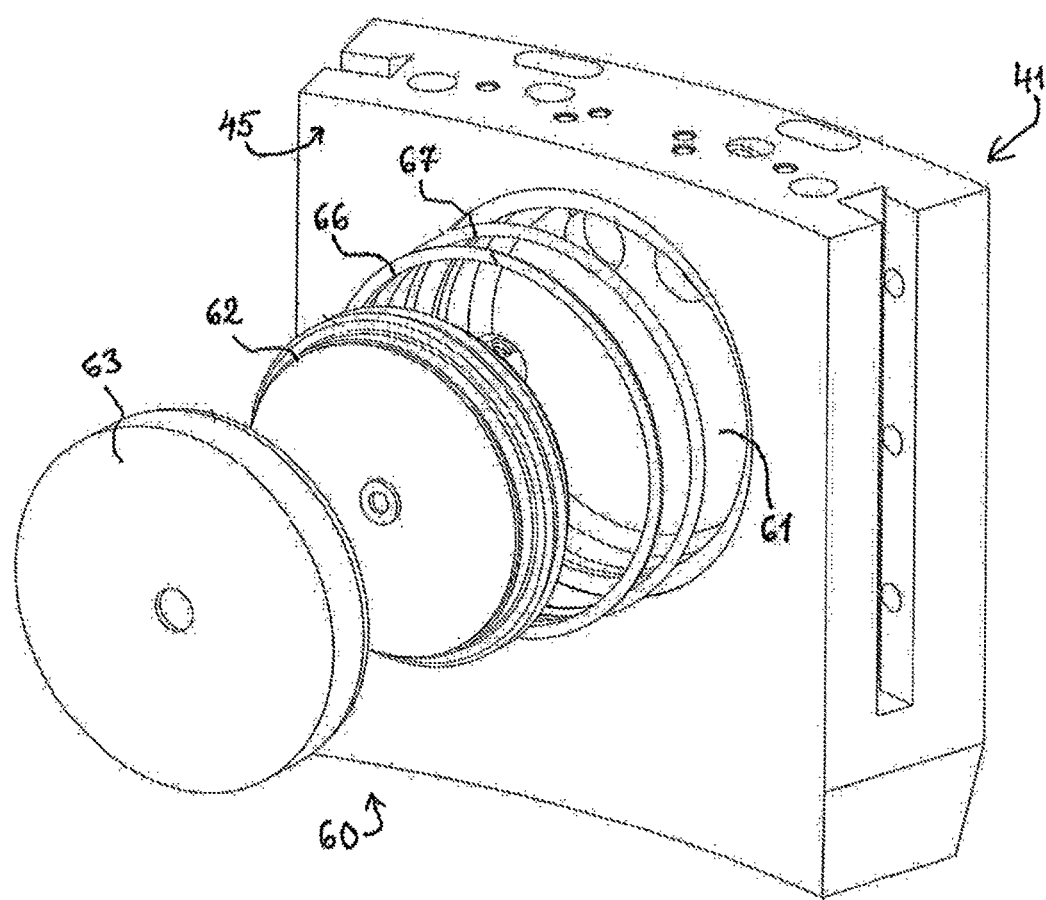
FIG. 4 is an axonometric view of a pressure block with the bellows cylinder in an exploded view.
Figure 5:
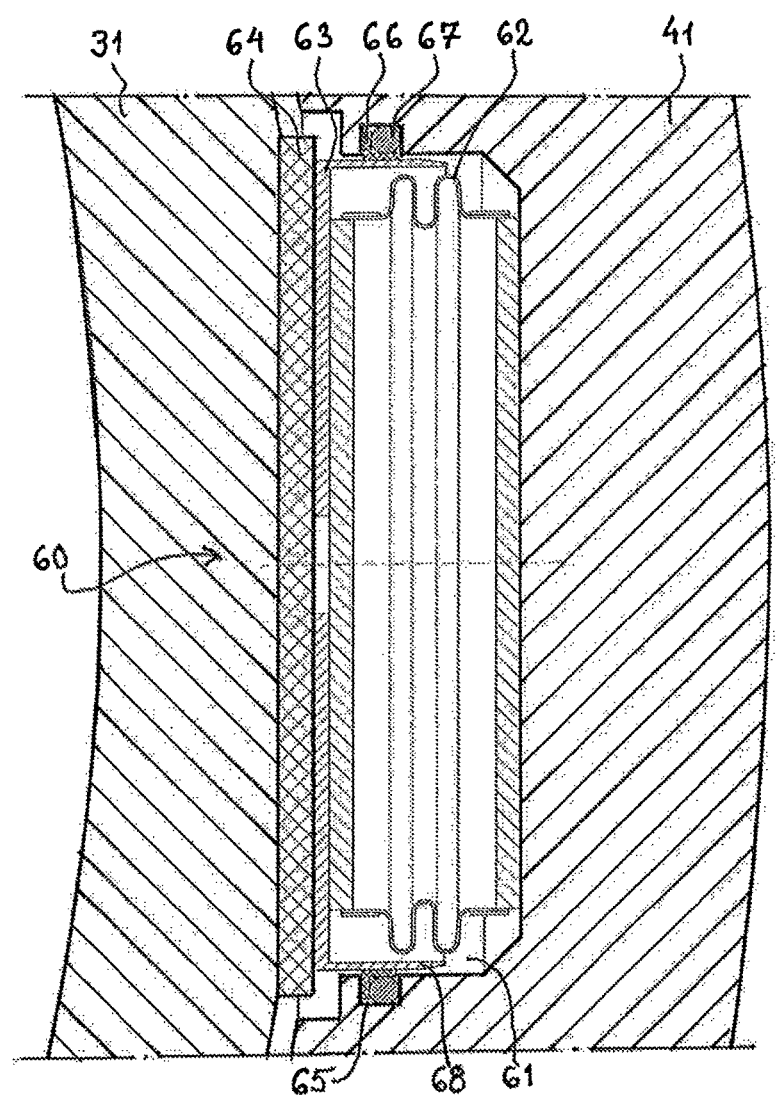
FIG. 5 is a cross-sectional view of the pressure block showing the structure of the bellows cylinder in more detail.

Now referring to FIGS. 4 and 5, a cavity 61 for the bellows cylinder 60 is formed in the inner surface 45 of the pressure block 41. The bellows 62 of the bellows cylinder structure 60 is located in said cavity 61. On the inner side 45 of the pressure block 41 a sealing bowl 63 is arranged on the bellows 62. The sealing bowl 63 has an essentially flat surface towards the contact shoe 31 and an electric insulating sheet 64 is arranged between the sealing bowl 63 and the outer surface of the contact shoe 31. The sealing bowl 63 is provided with a side edge 68 extending into the cavity 61. A circumferential groove 65 is made on the side wall of the cavity 61 and a gasket ring 66 is arranged into said groove 65 to give contact between the pressure block 41 and the sealing bowl 63. The gasket ring 66 has an L-shaped form comprising a radial branch extending into the circumferential groove 65 and an axial branch resting on the side edge 68 of the sealing bowl 63. The gasket ring 66 is made of an antimagnetic material, preferably bronze. A sealing ring 67 made of flexible material is arranged around the gasket ring 66 to give tension and pressure on the gasket ring 66 against the side edge 68 of the sealing bowl 63. The material of the flexible sealing ring 67 may be silicon and as seen in FIG. 5 it is located in the groove 65 around the axial branch of the gasket ring 66 and axially outwards from the radial branch of the gasket ring 66, i.e. on the cool side of the gasket ring 66, so that it will not be damaged because of the heat from the furnace.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. An arrangement comprising:
   a pressure block, said pressure block having an inner surface in which a cavity is formed, said pressure block being configured to form part of a pressure ring assembly of an electrode system of an electric arc furnace;
   a bellows cylinder having a bellows located in the cavity, said bellows cylinder being sealed in the pressure block; and
   a contact shoe configured to receive pressure from said bellows cylinder when said bellows cylinder is operated by hydraulic fluid, said contact shoe configured to form part of a contact shoe ring arranged on an inside of the pressure ring assembly, wherein:
   the bellows cylinder is sealed to the cavity with a sealing arrangement,
   on an inner side of the pressure block, a sealing bowl is arranged on the bellows, the sealing bowl having an essentially flat surface towards the contact shoe and being provided with a side edge extending into the cavity,
   a circumferential groove is made on a side wall of the cavity and a gasket ring made of antimagnetic material is arranged into said groove, and
   a sealing ring made of flexible material is arranged around the gasket ring to give tension and pressure on the gasket ring against the side edge of the sealing bowl.

2. The arrangement as claimed in claim 1, wherein the gasket ring has an L-shaped form comprising a radial branch extending into the circumferential groove and an axial branch resting on the side edge of the sealing bowl.

3. The arrangement as claimed in claim 2, wherein the flexible sealing ring is arranged in the groove around the axial branch of the gasket ring and axially outwards from the radial branch of the gasket ring.

4. The arrangement as claimed in claim 1, wherein the antimagnetic material of the gasket ring is bronze.

5. The arrangement as claimed in claim 1, wherein the flexible material of the sealing ring is silicon.

6. The arrangement as claimed in claim 1, wherein an electric insulating sheet is arranged between the sealing bowl and an outer surface of the contact shoe.

\* \* \* \* \*